(12) United States Patent
Tinichigiu et al.

(10) Patent No.: US 10,443,981 B2
(45) Date of Patent: Oct. 15, 2019

(54) FIREARM AND/OR FIREARM SIGHT CALIBRATION AND/OR ZEROING

(71) Applicant: Double Shoot Ltd., Ramat-Gan (IL)

(72) Inventors: Tal Tinichigiu, Ramat-Gan (IL); Oren Avman, Neve Ziv (IL); Itzhak Wilf, Savyon (IL)

(73) Assignee: Double Shoot Ltd., Ramat-Gun (IE)

( * ) Notice: Subject to any disclaimer, the term of this patent is extended or adjusted under 35 U.S.C. 154(b) by 0 days.

(21) Appl. No.: 16/090,821

(22) PCT Filed: Mar. 27, 2018

(86) PCT No.: PCT/IL2018/050355
§ 371 (c)(1),
(2) Date: Oct. 3, 2018

(87) PCT Pub. No.: WO2018/178981
PCT Pub. Date: Oct. 4, 2018

(65) Prior Publication Data
US 2019/0195599 A1 Jun. 27, 2019

(30) Foreign Application Priority Data

Mar. 30, 2017 (IL) .......................................... 251490

(51) Int. Cl.
*G06K 9/62* (2006.01)
*F41G 1/54* (2006.01)
(Continued)

(52) U.S. Cl.
CPC ............... *F41G 1/54* (2013.01); *F41A 33/00* (2013.01); *G06K 9/228* (2013.01); *G06K 9/6201* (2013.01);
(Continued)

(58) Field of Classification Search
USPC .................................................. 235/400–418
See application file for complete search history.

(56) References Cited

U.S. PATENT DOCUMENTS

| 4,285,137 A | 8/1981 | Jennie |
| 7,404,268 B1 | 7/2008 | Page |

(Continued)

FOREIGN PATENT DOCUMENTS

| WO | WO 2016/119291 | 8/2016 |
| WO | WO 2018/178981 | 10/2018 |

OTHER PUBLICATIONS

International Search Report and the Written Opinion dated Jul. 11, 2018 From the International Searching Authority Re. Application No. PCT/IL2018/050355. (9 Pages).

(Continued)

*Primary Examiner* — Matthew Mikels

(57) ABSTRACT

A method for calculation of firearm sight calibration instructions by processing an image of a shooting target. The method comprises receiving at least one image from at least one imaging device, the at least one image depicts a shooting target with a shot group comprising a plurality of bullet holes, receiving an indication of a firearm type and/or a firearm sight type to calibrate, using at least one hardware processor for calculating firearm sight calibration instructions according to at least one relative location of one of the plurality of bullet holes in relation to another of the plurality of bullet holes by processing the at least one image and at least one predefined parameter of the firearm and/or the firearm sight type, and outputting presentation instructions to present the firearm sight calibration instructions on a display of a client device.

20 Claims, 10 Drawing Sheets

(51) Int. Cl.
  *F41A 33/00* (2006.01)
  *G06T 7/00* (2017.01)
  *G06T 7/60* (2017.01)
  *G06K 9/22* (2006.01)

(52) U.S. Cl.
  CPC .............. *G06K 9/6267* (2013.01); *G06T 7/60* (2013.01); *G06T 7/97* (2017.01); *G06K 2209/21* (2013.01); *G06T 2207/20224* (2013.01)

(56) References Cited

U.S. PATENT DOCUMENTS

| | | |
|---|---|---|
| 7,703,679 B1 | 4/2010 | Bennetts et al. |
| 9,239,213 B2 | 1/2016 | Chen et al. |
| 2003/0003424 A1 | 1/2003 | Shechter et al. |
| 2011/0315767 A1 | 12/2011 | Lowrance |
| 2016/0102944 A1 | 4/2016 | Li |
| 2017/0115096 A1* | 4/2017 | Zhang .................... F41G 3/165 |

OTHER PUBLICATIONS

Search Report and Written Opinion dated Jul. 23, 2019 From the Intellectual Property Office of Singapore, IPOS Re. Application No. 11201807841T. (9 Pages).

* cited by examiner

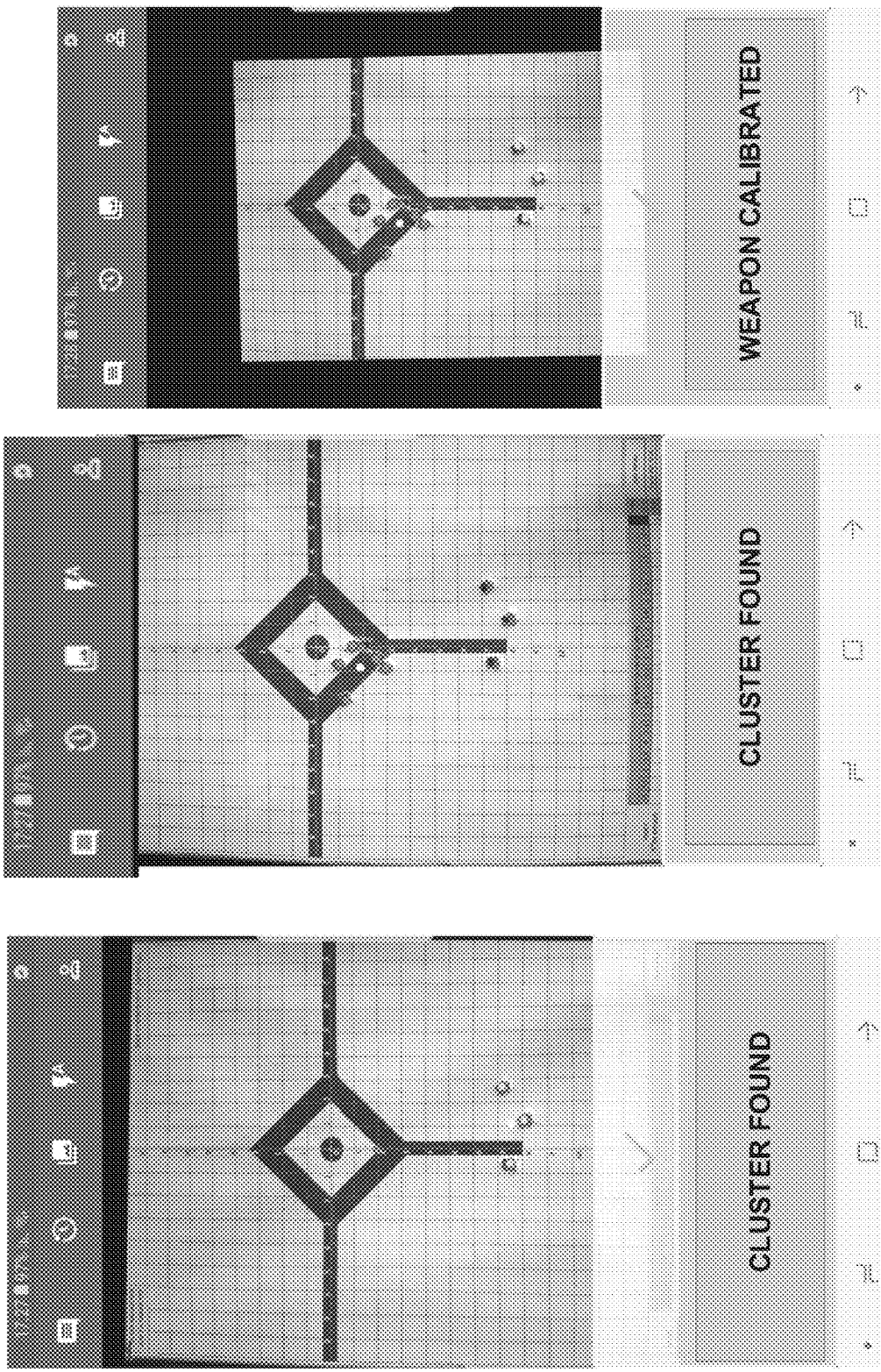

FIREARM AND/OR FIREARM SIGHT CALIBRATION AND/OR ZEROING

RELATED APPLICATIONS

This application is a National Phase of PCT Patent Application No. PCT/IL2018/050355 having International filing date of Mar. 27, 2018, which claims the benefit of priority of Israel Patent Application No. 251490 filed on Mar. 30, 2017. The contents of the above applications are all incorporated by reference as if fully set forth herein in their entirety.

BACKGROUND

The present invention, in some embodiments thereof, relates to calibration and, more specifically, but not exclusively, to automatic firearm sight calibration, also known as firearm zeroing.

Over the years, various techniques and devices have been developed to help a person accurately aim a firearm, such as a rifle or target pistol. One common approach is to mount on the firearm's barrel a sight or scope, through which the person views the intended target in association with a reticle, often with a degree of magnification. Although existing firearm sights have been generally adequate for their intended purposes, they have not been satisfactory in all respects.

For example, when a sight is first mounted on the barrel and/or body of a firearm, it needs to be aligned or "zeroed" with the firearm barrel, typically through a trial and error process. For example, a person may shoot one or more bullets at a target which is a known distance away, identify the extent to which the bullets strike the target at locations offset from the location at which the person was aiming, and then adjust the alignment of the sight in relation to the firearm in a manner intended to eliminate the offset. This sequence of steps is repeated in an iterative manner, until bullets are striking the target at substantially the same location where the person is aiming.

This process results in alignment of the sight and firearm and needs of a shooter for one specific set of conditions. However, during subsequent use of the firearm and sight, for example when hunting, a variety of conditions can vary from the conditions that existed during the alignment or zeroing process, and can thus affect the trajectory of a bullet. These include factors such as temperature, pressure, humidity, wind speed and wind direction, all of which affect the density of air and thus the drag exerted on the bullet, and drag in turn influences the trajectory. Further, the tilt of the firearm barrel can influence the direction in which gravity acts on the bullet in relation to the initial trajectory of the bullet, and this can in turn influence how gravity Firearms such as rifles and handguns have adjustable sights. In M16A2 Rifle for example elevation adjustments are made using the front sight, and elevation changes and windage adjustments are made using the rear sight.

In M16A2 Rifle the rear sight has an elevation knob with range indicators from 300 to 800 meters and two apertures for range. One aperture is marked 0-2 for short range from 0-200 meters and an unmarked aperture for normal range from 300 to 800 meters. The 0-2 (large) aperture is used for short range when the rear sight is all the way down. The 8/3 (300-meter) mark on the elevation knob is aligned with the index mark on the left side of the receiver. The rear sight also consists of a windage knob on the rear side of the sight. Each desecrate turning action of the windage knob, known as a click, moves a strike on a round from ⅛ inch (0.3 centimeters) at 25 meters to 4 inches (10 centimeters) at 800 meters. In M16A2 Rifle a windage scale is on the rear of the sight and the windage knob pointer is on the windage knob. To adjust windage or move the strike of the round, the windage knob is turned counterclockwise to move the strike to the left and clockwise to move the strike to the right. To adjust elevation the elevation knob is turned until the desired range is indexed at the index mark on the left side on the sight.

In order to calibrate the rear sight a mechanical zero is usually established on the rifle and then a target such as 25 meters zeroing target (e.g. see FIG. 1A) is used on shooting sessions with the firearm to be calibrated. After each shooting session a shot group is manually identified in the target, for example a shot group of three bullet holes. When the shot group is not within a defined region such as a circle on a silhouette of the target, squares on the target are used to determine the required adjustment. The squares are usually numbered around the edges of the target to equal the number of clicks required to relocate the shot group to the circle. The number of squares may be determined in relation to a center of the bullet holes which comprise the shot group is identified. The center may be calculated by marking a first line between bullet holes of one pair of bullet holes and then marking a second line between a third bullet hole and the center of the first line. This allows manually marking a center of the second line as the center of a shot group that comprises 3 bullet holes.

Additional shooting sessions are continuously held to form a sequence of shot groups and making corrections between the shooting sessions until a shot group is identified in the circle on the silhouette. Calibration is achieved when a shot group is within a target region such as the circle. Calibration is achieved when the shot group within the target region is tight, for example holes are not located at a distance of more than few centimeters from, one another.

SUMMARY

According to some embodiments of the present invention there is provided a method for calculation of firearm sight calibration instructions by processing an image of a shooting target. The method comprises receiving at least one image from at least one imaging device, the at least one image depicts a shooting target with a shot group comprising a plurality of bullet holes, receiving an indication of a firearm sight type of a firearm to calibrate, using at least one hardware processor for calculating firearm sight calibration instructions according to at least one relative location of one of the plurality of bullet holes in relation to another of the plurality of bullet holes by processing the at least one image and at least one predefined parameter of the firearm sight type, and outputting presentation instructions to present the firearm sight calibration instructions on a display of a client device.

Optionally, wherein the indication in a firearm type.

Optionally, wherein the at least one imaging device and the processor are integrated into a common handheld device.

Optionally, the method comprises: storing the plurality of bullet holes as a plurality of historical bullet holes and receiving at least one new image depicting the shooting target with a new shot group comprising a plurality of new bullet holes, the plurality of new bullet holes are identified in a calculation excluding the plurality of historical bullet holes. The at least one hardware processor is used for: calculating a plurality of new distances between the plurality of new bullet holes by processing the at least one new image, calculating new firearm sight calibration instructions according to the plurality of new distances and the at least one predefined parameter and outputting new presentation instructions to present the new firearm sight calibration instructions on the display.

Optionally, wherein the at least one hardware processor is used for: calculating a shot group analysis based on a distribution pattern of the plurality of bullet holes in relation to the shooting target. The presentation instructions comprise a recommendation selected according to an outcome of the shot group analysis.

Optionally, wherein the at least one hardware processor is used for: analyzing an output of at least one sensor for an identification of an ending of a shooting event and triggering the calculation in response to the identification.

More optionally, wherein the at least one sensor is a member selected from a group consisting of: an audio sensor, an accelerometer, a gyroscope sensor and an imaging sensor monitoring a front end of a barrel of the firearm.

More optionally, wherein the at least one sensor is integrated in a mobile device used by the user.

Optionally, wherein the firearm sight calibration instructions comprise an indication of a number and a direction of desecrate turning actions for turning a sight calibration knob.

Optionally, the method comprises presenting the shooting target through a graphical user interface (GUI); the shot group is marked by a user who uses the GUI.

Optionally, the method comprises: receiving a firearm unique identifier value, using the firearm unique identifier value for extracting information comprising at least one of: historical shot group data and historical firearm sight calibration instructions data, and estimating a firearm functionally according to an analysis of the extracted information and the an output of an analysis of the shot group.

More optionally, the firearm unique identifier value is received from an analysis of a machine readable code imaged in at least one image.

More optionally, the firearm unique identifier value is received from a graphical user interface presented on a display of a mobile device.

Optionally, the method comprises: acquiring information comprising at least one of: historical shot group data and historical firearm sight calibration instructions data of a plurality of firearms of the firearm type and calculating a firearm sight type functionality score according to an analysis of the acquired information and the output of an analysis of the shot group.

Optionally, the method comprises: acquiring historical data comprising at least one historical shot group of the firearm or of at least one other firearm of the firearm type and estimating a malfunction in the firearm according to a match between the historical data and the shot group.

Optionally, the method comprises classifying the shot group according to a classifier created based on an analysis of a plurality of historical shot groups of a plurality of other firearms or a plurality of firearm sights and/or manufacturer/professional instructions.

According to some embodiments of the present invention there is provided a handheld device of calculation firearm sight calibration instructions by processing an image of a shooting target. The handheld device comprises at least one image sensor adapted to capture at least one image, the at least one image depicts a shooting target with a shot group comprising a plurality of bullet holes, an interface adapted to receive an indication of a firearm sight type of a firearm to calibrate, a memory storing a code, at least one hardware processor adapted to execute a code for calculating firearm sight calibration instructions according to at least one relative location of one of the plurality of bullet holes in relation to another of the plurality of bullet holes by processing the at least one image and at least one predefined parameter of the firearm type, and a presentation unit adapted to present the firearm sight calibration instructions.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 7A-7C are respectively screenshots of windows of a GUI presenting hole clusters captured during a calibration session, according to some embodiments of the present invention.

DETAILED DESCRIPTION

Figure 1A:
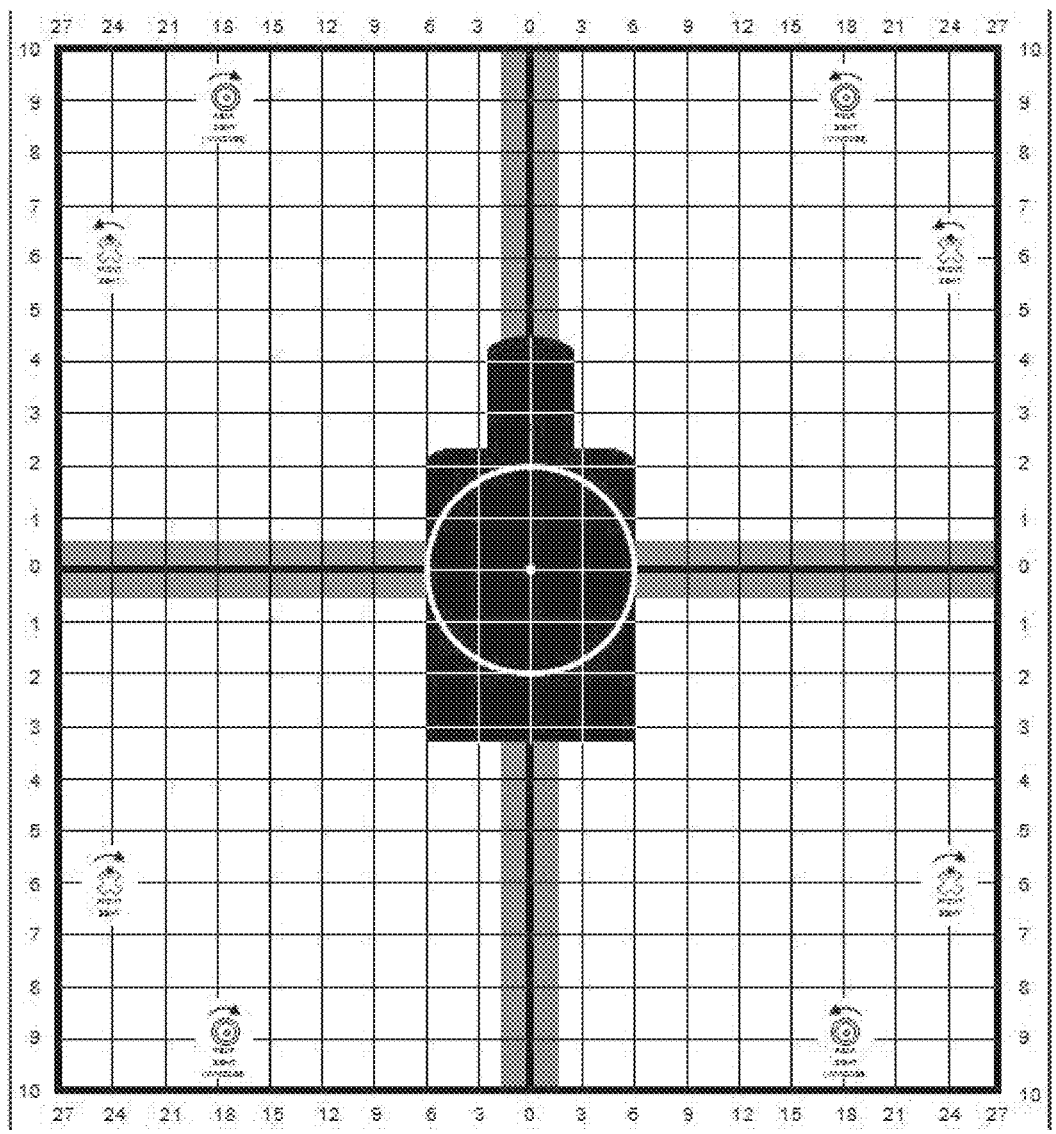
FIGS. 1A-1E are images of commonly used shooting targets from a number of points of view.

The present invention, in some embodiments thereof, relates to calibration and, more specifically, but not exclusively, to automatic firearm sight calibration analysis and calculation.

According to some embodiments of the present invention there are provided methods, devices and systems of generating instructions for calibrating (zeroing) a sight of firearm by processing one or more images of a shooting target to detect relative location of bullet holes of a shot group in relation to a reference area (e.g. center of target) and automatically deducing therefrom calibration instructions. The calibration instructions are optionally deduced for a firearm (e.g. M-16, Tavor, M-4 etc.) or a firearm sight (e.g. telescopic, Red-Dot, or iron sights) and/or a combination thereof. Optionally, the calibration instructions are calculated and presented on hardware of a handheld device such as a mobile phone or a tablet. Optionally, the calibration instructions are adapted to the firearm and/or firearm sight type. The shot group includes bullet holes formed by bullets shot from a firearm to be calibrated in a single shooting session. A shooting session is one out of one or more sessions of a calibration process. Optionally, historical shot groups which are identified in a certain shooting target are recorded and removed from a process for detection of a new shot group.

According to some embodiments of the present invention there are provided methods, devices and systems estimating functionality levels and/or malfunctions of a specific firearm, firearms of a certain firearm type, and/or sights based on an analysis of a dataset of a plurality of shot groups and/or plurality of calibration recommendations.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2A:
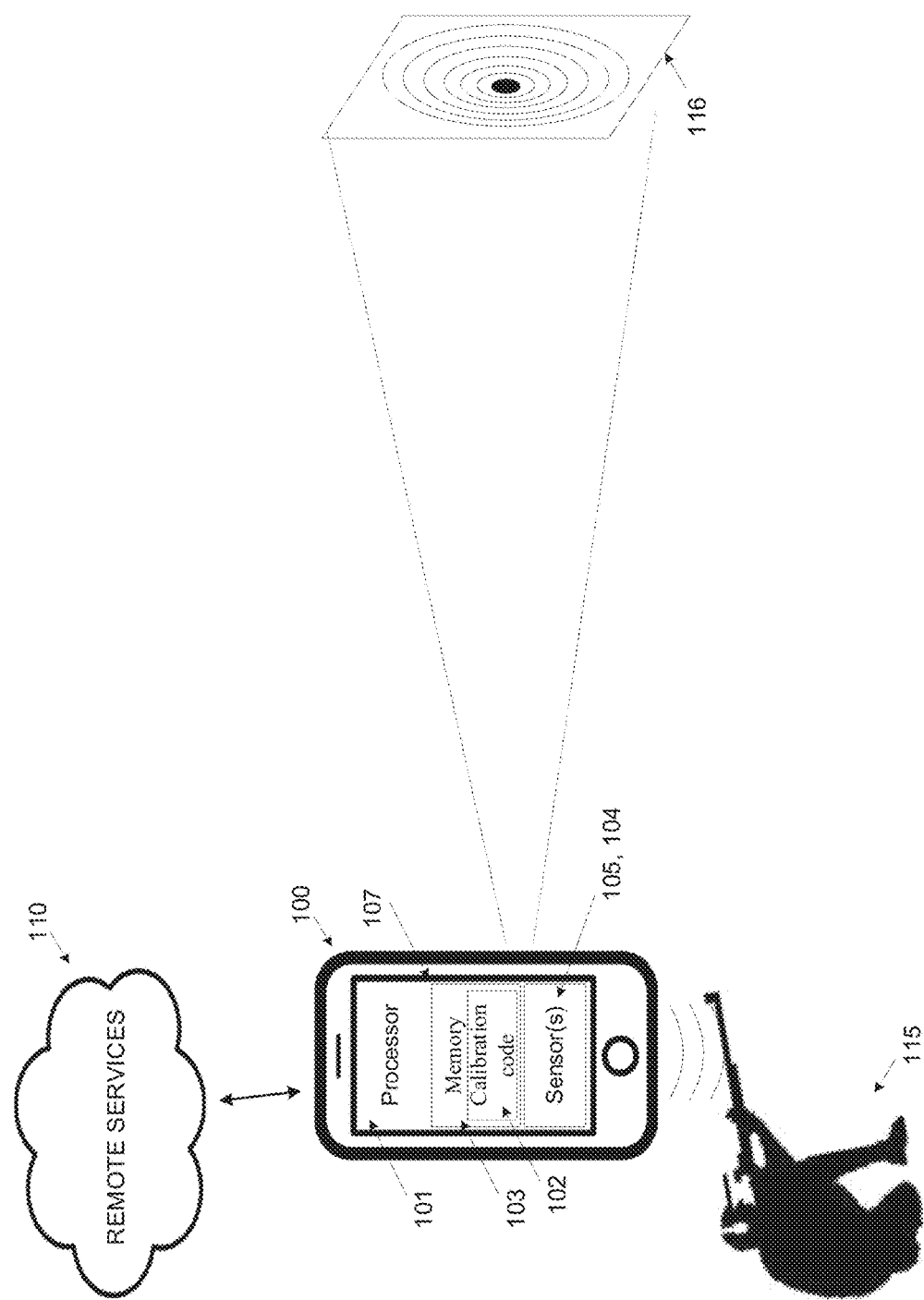
FIG. 2A is a schematic illustration of a calibration system for analyzing one or more images of a shooting target during a shooting session to calculate firearm sight calibration instructions, according to some embodiments of the present invention.

Reference is now made to FIG. 2A which is a schematic illustration of a calibration system 100 for analyzing one or more images of a shooting target 116, zeroing target, during shooting session(s) to calculate firearm sight calibration instructions based on an analysis of an image depicting the distribution of shooting holes of a shot group in the shooting target 116, according to some embodiments of the present invention. The firearm sight calibration may be a sight of any firearm, for instance automatic, semi-automatic (self-loading) and manual firearms and/or a combination of a firearm sight and a firearm type. The firearm may be a rifle or a gun.

As used herein, a shot group is a group of bullet holes formed in a shooting target 116 by bullets shot by a firearm targeted for calibration at a single shooting session for example 5 rounds of shootings at the shooting target 116 when it is placed at a 25 meter distance or 100 meter distance from the shooter. As used herein, a firearm type, a firearm sight type or a combination thereof may be referred to herein interchangeably.

Calibration instructions are instructions to a shooter 115 to manually calibrate a firearm, for instance by rotating a blade or a knob and/or to operate a mechanical mechanism for adjusting a sight location. Calibration instructions may be referred to as zeroing instructions. The calibration system 100 includes a processor 101 executing a calibration code 102 for calculating firearm sight calibration instructions, a memory 103 hosting the calibration code 102, one or more image sensor(s) 104 such as camera(s) for capturing one or more images of the shooting target 116 and optionally one or more sensors 105 such as accelerometers which monitor usage of a firearm by a user 115 during the shooting session. Optionally, the image sensor is camera enhanced with a telescopic optical arrangement to allow acquiring an image of the shooting target from a range of 25 meter (m). The calibration code 102 may be an app store application or an application installed directly on a client device. The calibration code may be program instructions stored in a non-transitory medium, for example a software application executed on one or more processing nodes having one or more processors. The calibration system 100 may be or include a handheld device, such as a mobile phone or a tablet or a smartwatch. The processor of the calibration system 100 may reside on, a server, a computer, a desktop, a tablet, a smartphone which communicates with the handheld device. The image sensor(s) 104 may be, for example, an image sensor such as a camera, a stereoscopic camera, a night-vision camera and/or an infra-red (IR) camera which are optionally integrated into the handheld device. The sensors 105 may include, for example, an audio sensor such as a microphone, an accelerometer, a gyroscope and an imaging sensor which optionally monitor a front end of a barrel of the firearm. The calibration code may include instructions to operate a user interface, for example, a graphical user interface (GUI) designed to be presented to user 115 on a presentation unit such as a speaker or a display 107, optionally the integrated speaker or display of the handheld device. The GUI maybe used to allow the user input information such as firearm and/or sight type, model and/or unique identifier (ID).

Optionally, the system 100 connects to one or more remote services 110, for example, a database and/or an analytics service for generating reports and/or for storing outputs of the calibration process and/or shot group data. The remote services 110 may be available through, for example, a cloud service, a module executed on one or more remote processing nodes, for example, a server and the likes.

Figure 3A:
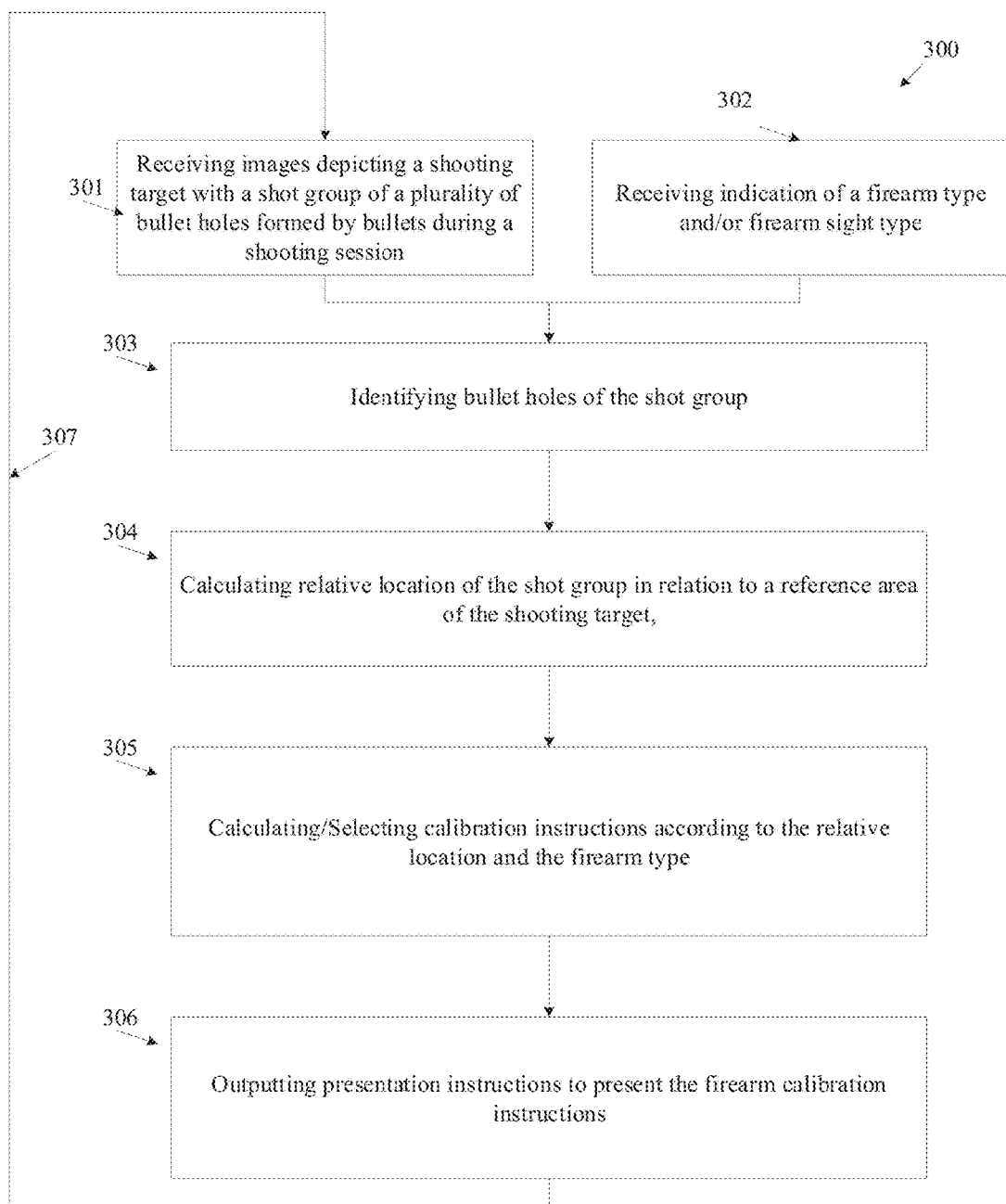
FIG. 3A is a flowchart of an exemplary process for calculating instructions for calibrating a firearm based on an analysis of one or more images of a shooting target, according to some embodiments of the present invention.

Reference is also made to FIG. 3A which is a flowchart of an exemplary process for calculating instructions for calibrating a firearm based on an analysis of one or more images of a shooting target, according to some embodiments of the present invention. The process 300 may be used for calculating instructions for calibrating a firearm such as a gun, a pistol and/or a rifle or sight. The process 300 may be executed on a processor(s) of a handheld device such as a Smartphone or a tablet or one or more processing nodes, for example, a local processing node, such as a computer, a server and/or a cluster of processing nodes and/or on a remote processing node, for example, a remote server, a remote server-cluster and/or a cloud service. Optionally, the process 300 is split between two or more of the processing nodes such that each of the processing nodes executes one or more segments of the process 300.

As shown at 301, the process 300 starts with receiving one or more images from one or more image sensor(s) such as the imaging device 104. The one or more images depict the shooting target 116 with a shot group of a plurality of bullet holes formed by bullets during a shooting session conducted by the user 115. A shot group may include 3, 5, 7 or any intermediate or larger number of bullet holes.

Optionally, a welcome or initialization window is presented to the user when initializing a respective application. The welcome or initialization window may include instructions of how to capture the images from one or more image sensor(s) such as the imaging device 104 or how to upload images from a repository. The welcome or initialization window may also gather other information such as firearm ID, user ID, number of calibration sessions, age, gender, experience level and/or the like. The information may be used for learning as further described below.

The one or more images may be for example video frames or images which are captured using an image sensor of the handheld device. The one or more images may be acquired in response to press of a button in the GUI and/or automatically when the shooting target is identified by image processing in frames of a video captured by the image sensor of the handheld device. The acquisition is optionally held in real time, for instance less than a second after shooting target is identified by image processing in frames.

Optionally, the one or more images are images having an image quality above a predefined threshold. The image quality is optionally a perceived image degradation measure for instance compared to an ideal or perfect image. The measure may be based on the presence or absence of distortion or artifacts in the image. The measure may be based on Sharpness, Noise, Dynamic range, Tone reproduction, Contrast, Color accuracy, Distortion, Vignetting, Exposure, Lateral chromatic aberration (LCA), Lens flare, and/or Artifacts.

Optionally, quality of the received images is estimated, for example by executing a quality estimation function. For instance, when the quality is below a threshold received images are ignored and when the quality is above the threshold the image is used. In such a scheme, only images with sufficient sharpness and/or contrast are analyzed. Optionally, image metadata may also be extracted, for instance Other image acquisition conditions may verified, for instance a target center alignment which indicates when the target center is aligned with the center of the Field Of View (FOV) (e.g. determined by alignment parameters), FOV coverage that indicates when the FOV covers the entire target and optionally not too much area around the target, axis alignment that indicates that the image axes are sufficiently aligned with the target axes (no excessive in-plane rotation), perspective distortion level and/or the like. The image quality analysis may also indicate and/or used for alerting the user about unsuitable targets. This is as conditions may not be not met when the target is excessively dirty, partially torn, contains an excessive amount of bullet holes and/or the like.

Now, as shown at 302, an indication of a firearm sight type of a firearm to calibrate is received. The indication may be a user selection identified using the GUI and/or automatically by analyzing the characteristics of the bullet holes, for instance diameter and/or shape and/or fire noise as recorded by the sensor(s) 105. The indication allows selecting and/or calculating parameters for bullet hole detection and calibration instructions for example as described below. The parameters may be an outcome of a machine learning process and/or based on desired correlation as exemplified below. Optionally, the firearm sight type of the firearm is set as a default and not manually changed. Firearm sight type and firearm type are referred to herein interchangeably as native firearm sight type which may be automatically deduced from firearm type indication. Optionally, a user provides both firearm sight type and firearm type so as to allow deducing calibration instructions based on parameters of the firearm sight and firearm type itself (e.g. caliber, barrel length etc.).

As shown at 303, bullet holes of the shot group are identified based on a mathematical model and/or morphology. The mathematical model of bullet holes may be defined as connected components which are darker compared to surrounding pixels and having an absolute threshold and a relative threshold (difference), an area of bullet hole region, and/or a geometrical shape of bullet holes of a firearm, optionally of the indicated firearm type. Optionally, a firearm sight type record is acquired in response to the user selection 302 and used for extracting parameters for the mathematical model. Optionally holes are detected as described in International Journal of Applied Mathematics Volume 27 No. 6 2014, 549-566 ISSN: 1311-1728 which is incorporated herein by reference. Optionally, coordinates of each bullet hole are stored in a shot group record.

Bullet holes and/or distribution thereof may be identified based on visual descriptors using machine learning techniques. In such embodiments visual descriptors (also known as visual words) such as Scale Invariant Feature Transform (SIFT) local feature descriptor are used to represent bullet holes and/or shot groups in multiple images to facilitate supervised or unsupervised learning of a classifier for bullet holes and/or shot group detection and classification, see David G. Lowe, Distinctive Image Features from Scale-Invariant Keypoints, Computer Science Department University of British Columbia Vancouver and Videos Josef Sivic and Andrew Zisserman, Google: Efficient Visual Search of Videos, Department of Engineering Science University of Oxford which are incorporated herein by reference. The multiple images for supervised or unsupervised learning may be images gathered by the system 210 for the generation and presentation of calibration instructions as described herein.

Figure 4:
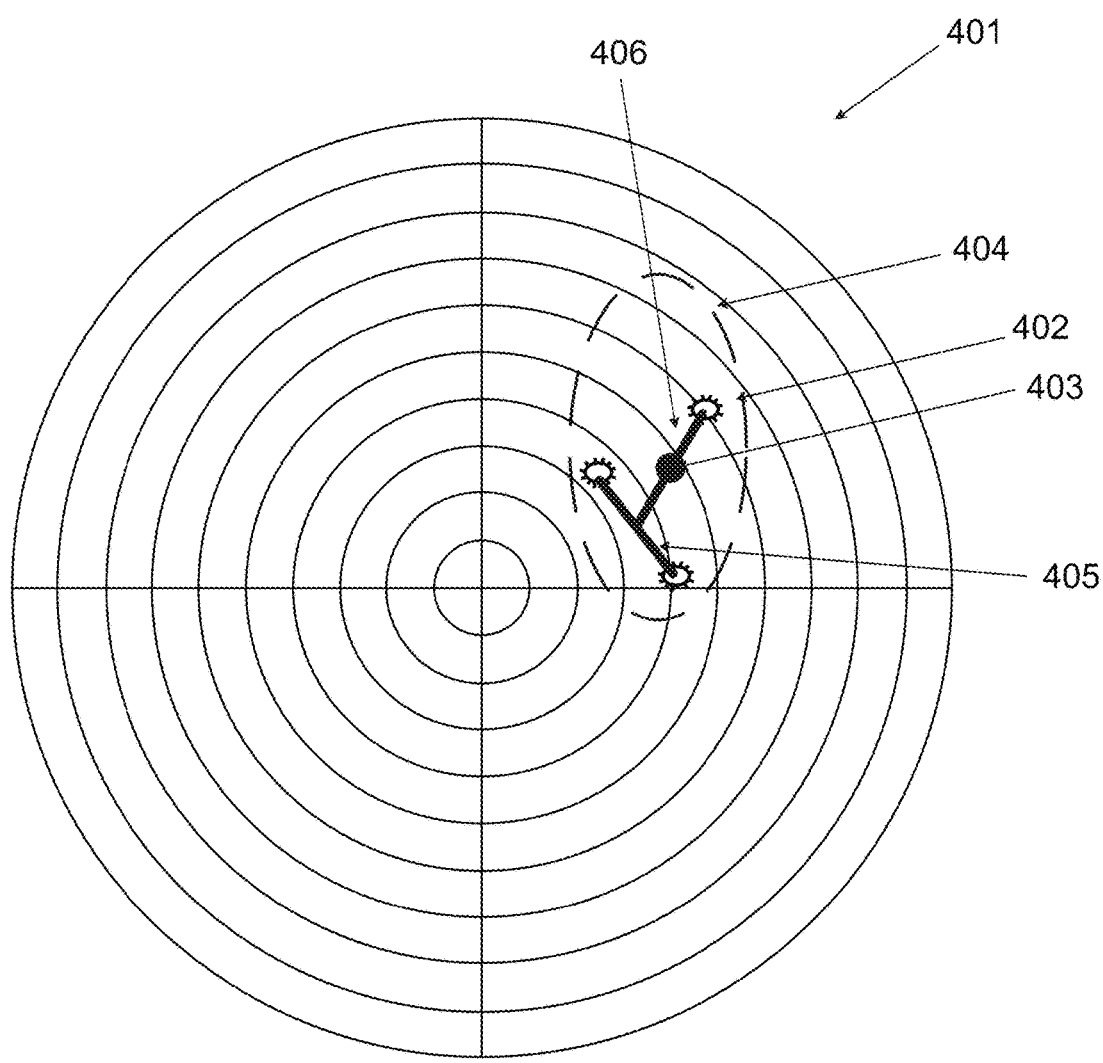
FIG. 4 is a commonly used shooting target having a shot group with a plurality of bullet holes.

Now, as shown at 304, a calculation of relative location of the shot group in relation to a reference area of the shooting target, for instance the center of a shooting target is made. The shot group location may be defined as a center calculated based on the location of the bullet holes. The shot group center is calculated by processing the one or more images using the processor(s) 101 to identify the location of the bullet holes in relation to one another, for instance using the data from the respective shot group record. For example, FIG. 4 is an exemplary shooting target 401 having a shot group 404 with a plurality of bullet holes such as 402. FIG. 4 depicts how the center is automatically calculated. First, a first line (distance) 405 is identified between holes of one pair of holes. Then, a second line (distance) 406 is identified between the third hole and the center of the first line. Now, a center of the second line 403 is identified as the center.

In another example, a line is automatically calculated between bullet holes of each of two pairs of bullet holes which are most proximate to one another. Then, an additional line is automatically calculated between centers of the lines. Then, a further additional line is automatically calculated to the center of the additional line and an unpaired drill hole. This allows dividing the further additional line to five and identifying the fourth line away from the unpaired drill hole as the center of a shot group that comprises 5 bullet holes.

Now, as shown at 305, firearm sight calibration instructions are automatically calculated or selected according to the relative location of the shot group and/or a geometric feature of the shot group, such as a geometric feature and the center of mass, in relation to a reference area of the shooting target and one or more predefined parameters of the firearm type. For instance, a plurality of firearm sight type records are used. Each firearm sight type record includes a conversion dataset or functions for converting a relative location of the shot group in relation to a reference area of the shooting target into firearm specific calibration instructions. For instance, calibration instructions may be turning a sight knob such as a windage knob or an elevation knob according to a number of turns which is determined based on the distance and/or direction from the reference area. Other instructions may be to rotate a sight blade and/or windage screw with a zeroing wrench, see for example operator manual of TAVOR™ SAR.

Figure 6:
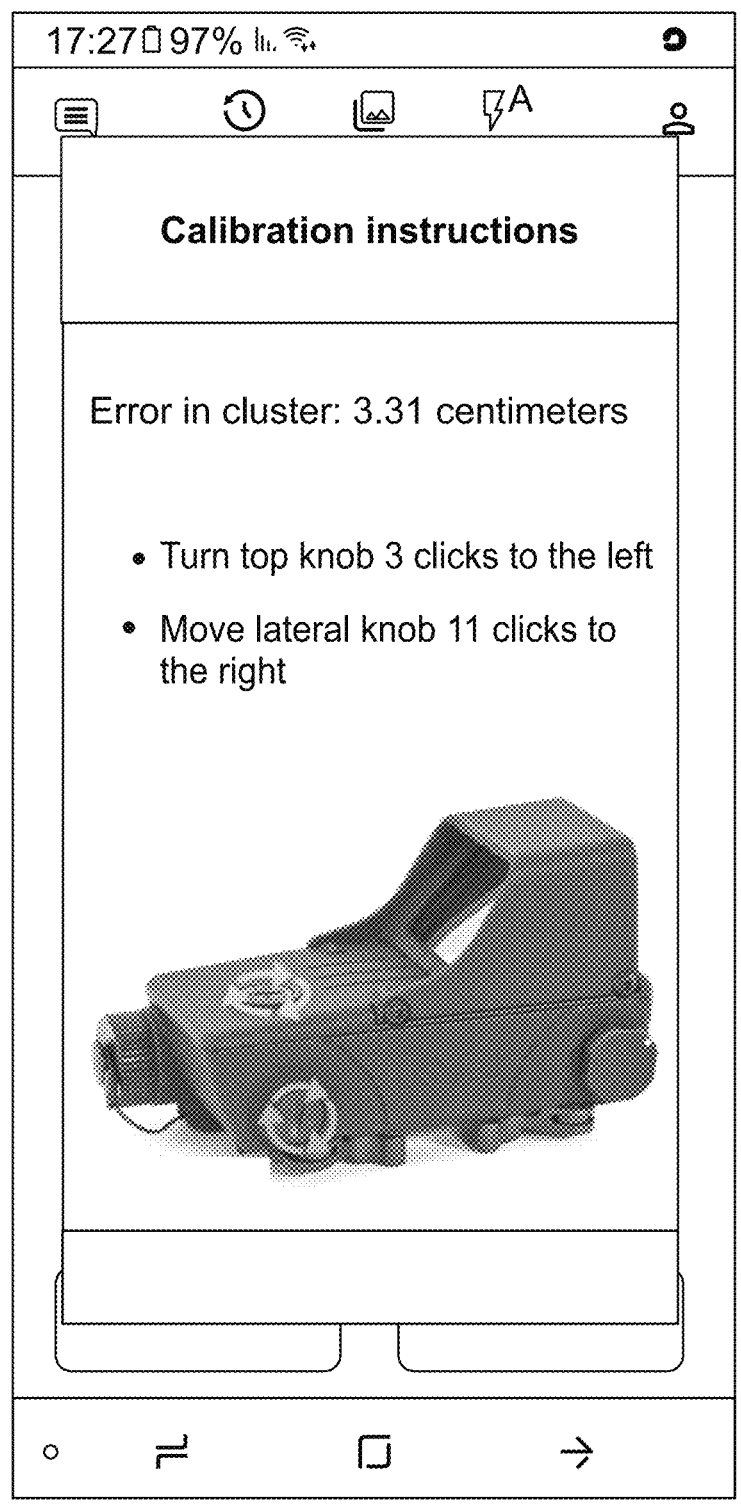
FIG. 6 is a screenshot of a window comprising textual and graphical instructions indicative of required actions, according to some embodiments of the present invention.

This allows, as shown at 306, outputting presentation instructions to present the firearm sight calibration instructions on the display 107. The calibration instructions may be textual and/or graphical instructions indicative of user actions for calibration of the firearm, for example indicative of a knob or a blade to turn, a number of a desecrate turning actions such as knob/blade turns, and a knob/blade turning direction. Exemplary calibration instructions can be textual, for example, "turn the knob 3 clicks to the left", "turn the blade 2 clicks up" and or graphical, for instance an animation or an image indicating direction and number of clicks for adjustment. For example, see FIG. 6 which is a screenshot of a window comprising textual and graphical instructions indicative of a required actions and the location of the knobs for performing the required actions. The instructions are optionally color coded. Alternatively or additionally, the firearm sight calibration instructions are sent to a manipulation mechanism that adjusts the sights accordingly, for example a mechanical arm that is controlled by a controller that receives the firearm sight calibration instructions and translate them into mechanical sight adjustment actions.

The calibration instructions may be determined based on a classification determined by applying machine learning processes on historical data gathered using the system, for instance improvements between two consecutive shot groups of two consecutive shooting sessions.

As shown at 307, the process of calculating and outputting for presentation of calibration instructions may be iteratively repeated wherein in each iteration a new shot group is identified to calculate new calibration instructions based on the assumption that the previous calibration instructions have been implemented by the user 115 and/or a manipulation mechanism. Optionally, shot groups which are captured iteratively are associated or otherwise connected as a sequence. This sequence may be analyzed to identify a pattern indicative of a calibration and/or firearm and/or sight firearm malfunction and/or the like.

According to some embodiments of the present invention, an analysis of signals obtained from one or more sensors of the calibration system 100, for example a mobile device, is performed for assuring quality of target images. This may be required as a distance, position and/or orientation of the target in relation of the calibration system 100 is not fixed. The process for assuring quality of target images is optionally based on one or more images captured by the image sensor(s) 104. The analysis can identify and specify the reason for erroneous target capture, at the time of capture or afterwards. Such identification can prevent further analysis and/or provide corrective instructions to the user.

The analysis may occur in real-time or near real-time, either as a preprocessing step, or interactively, and/or in each shooting session and/or for assuring that necessary conditions for image capturing are met.

Figure 1B:
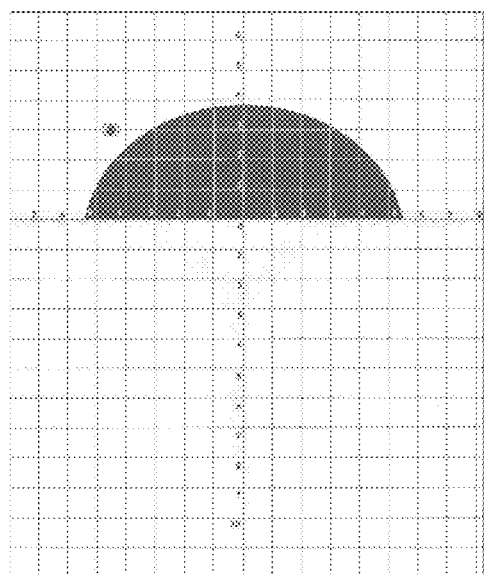
Figure 1C:
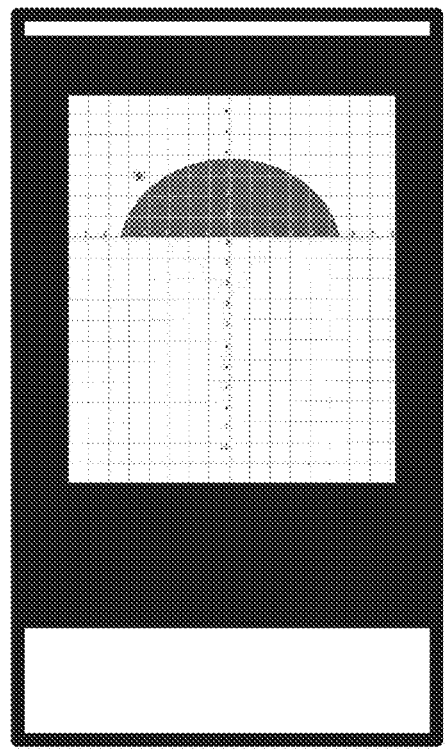
Figure 1D:
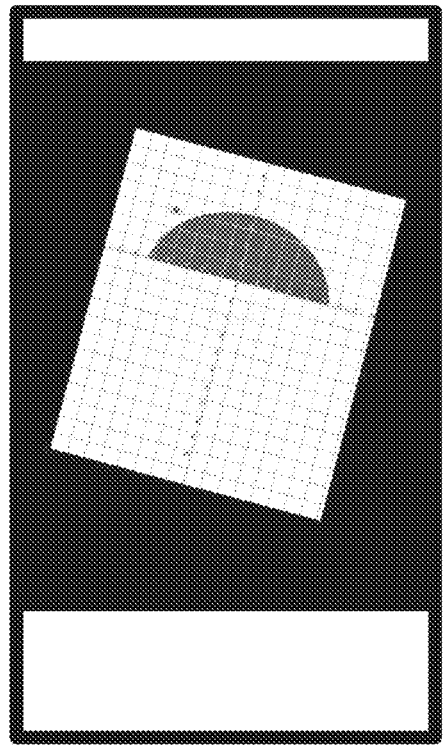
Figure 1E:
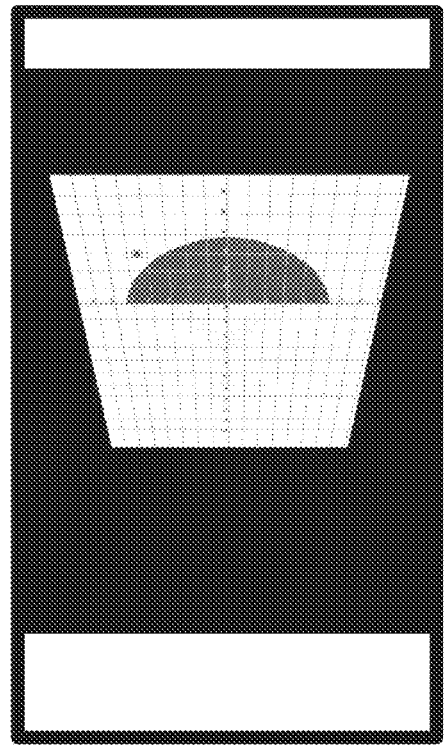

FIG. 1B is an image of a calibration target, FIG. 1C is an image of a correct capture of the calibration target and FIGS. 1D and 1E are images of several less favorite situations detected by reading one or more device sensors.

Figure 2B:
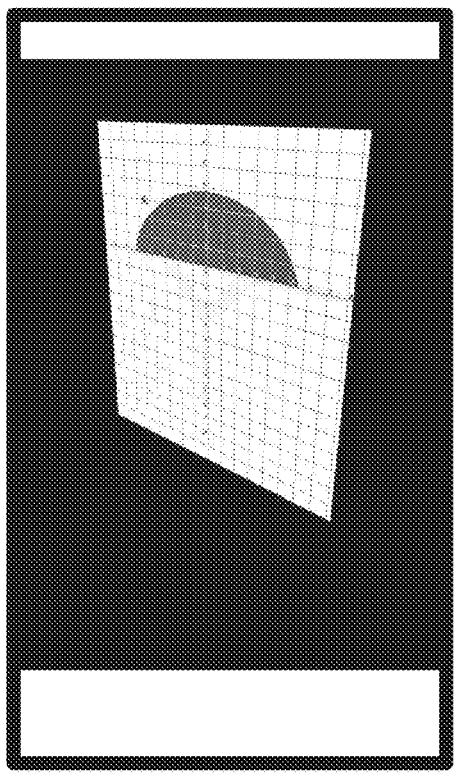
FIGS. 2B-2E are images of commonly used shooting targets from a number of points of view.
Figure 2C:
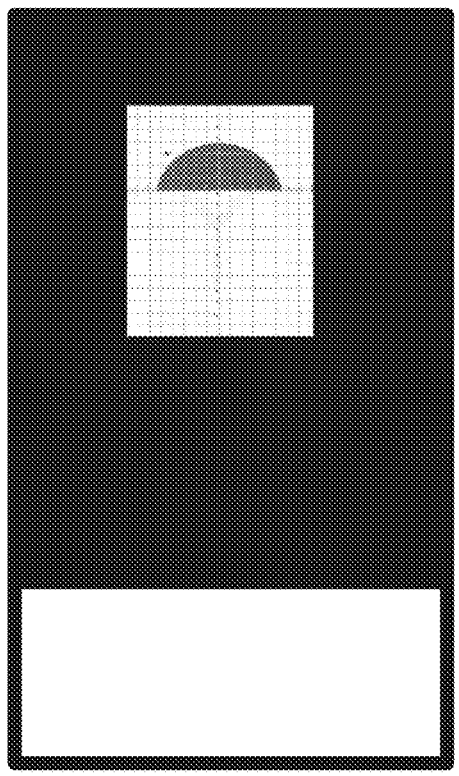
Figure 2D:
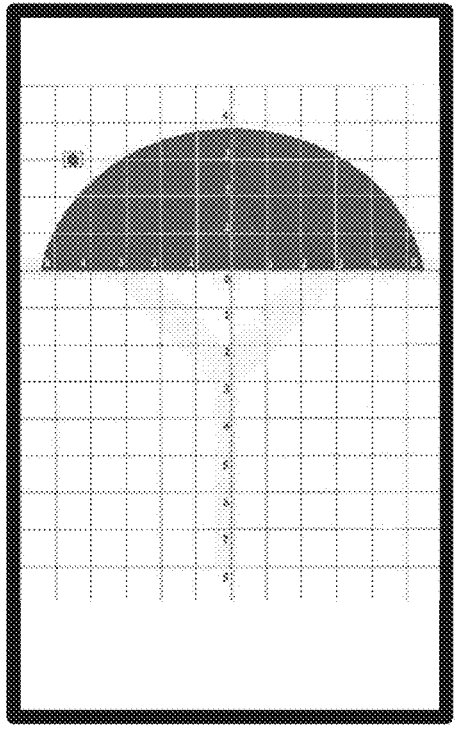
Figure 2E:
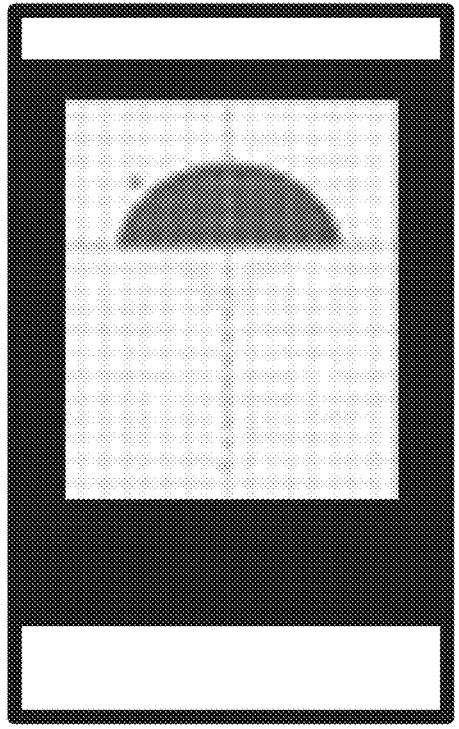

FIGS. 2B-2E depict several frames taken from less favorite points of view. FIG. 2B is an image of a perspective distortion induced by capturing the target image from a side position, FIG. 2C is an image captured from a distance and FIGS. 2D-2E are respectively an image captured from a great proximity such that no lateral borders are captured and using a zoom-in function. When the captured frames are captured from such points of view accuracy of measurement maybe reduced. When only a part of the calibration target is visible, drills can be missed simply because they are outside the captured frames. Furthermore, for example as depicted in FIG. 2D, frames captured from close proximity are blurred, which also may affect the ability to properly detect and locate hits. Measurement can trivially fail due to a false capture—the user erroneously or in purpose capturing another object.

Figure 3B:
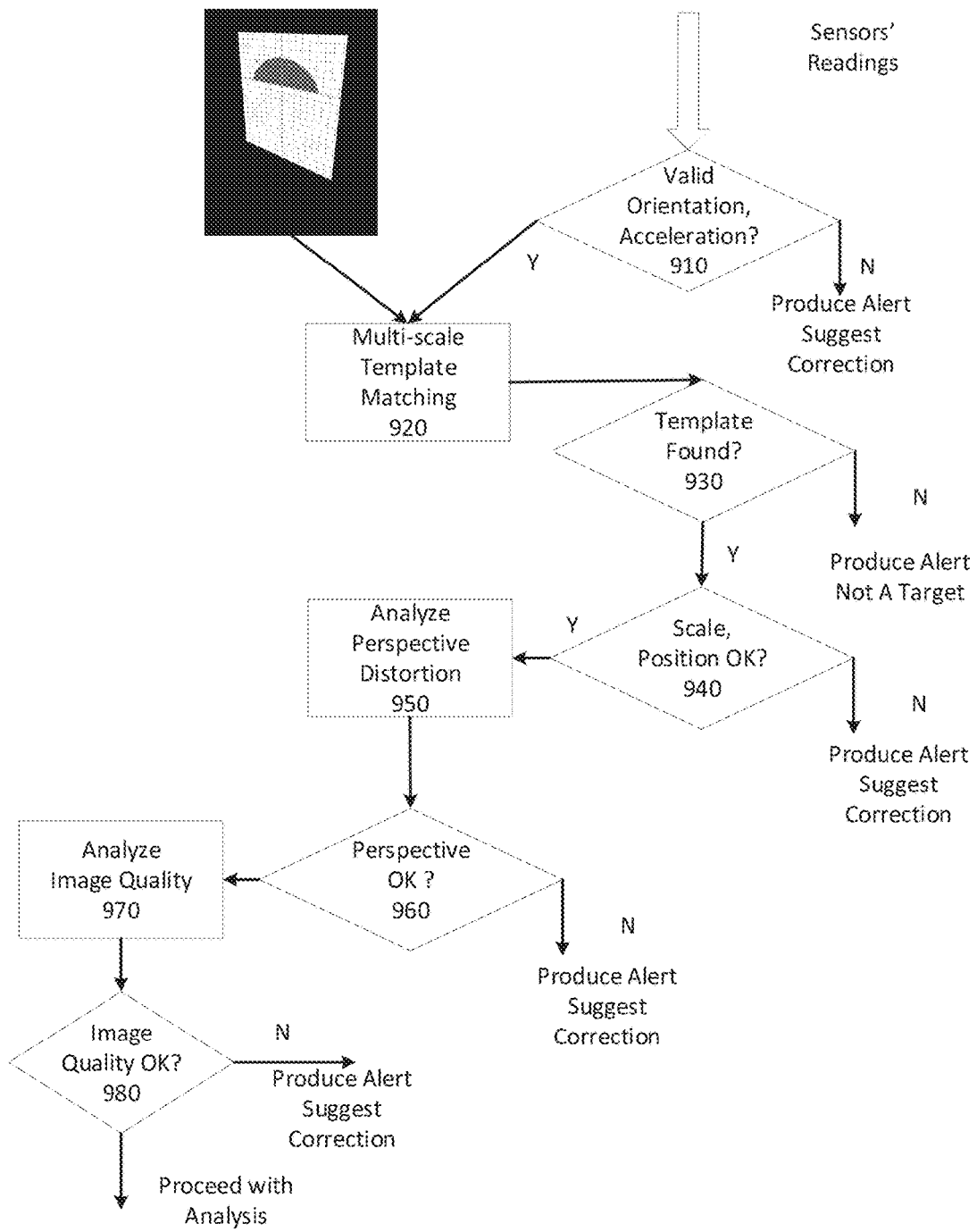
FIG. 3B is a flowchart of an exemplary process for assuring quality of target images, according to some embodiments of the present invention.

FIG. 3B is a flowchart of a process for exemplary process for assuring quality of target images, according to some embodiments of the present invention. The process for assuring quality of target images may be performed during or before 301 which is described above. For example, the process may be performed before the shooting session. In these embodiments, as shown at 910, analysis begins by reading the orientation and acceleration values. When the device is rotated, tilted or accelerating, an alert may be presented to the use together with an explanation and/or suggested correction, and further image analysis is inhibited. Proceeding with analysis, according to some embodiments, AS shown at 920, a template target may be used, for example selected from a number of templates in different possible scales (920). A bulls' eye pattern may be used as a template, see for example Fast Multi-scale Template Matching Using Binary Features, Feng Tang and Hai Tao, IEEE Workshop on Applications of Computer Vision (WACV'07) which is incorporated herein by reference.

As shown at 930, failure to locate the template (930) may induce a presentation to the user such as "no target is found".

As shown at 940, computed template scale and position are used to indicate a number of capturing errors, for example excessive distance, zoom-out, excessive zoom-in and/or impossible cropping. Again, an alert may be produced together with an explanation and/or suggested correction which is deduced from an image analysis, for example "move closer", "move away", and "keep entire target in the field of view". A scale that produces a maximum matching score and position of that score provide a coarse estimate of the image transform, mapping a known image pattern, to the captured image. As shown in FIG. 1A, a calibration target will comprise a grid made of 2 perpendicular sets of parallel lines. A possible approach to estimating perspective from set of parallel lines is based on computing the vanishing point; see for example [Yin, Xu-Cheng et al. (2011). Robust Vanishing Point Detection for MobileCam-Based Documents. Proceedings of the International Conference on Document Analysis and Recognition, ICDAR. 136-140] which is incorporated herein by reference.

Extreme perspective distortion may occur whenever optical axis of the camera is not perpendicular to the target plane. After the estimation of perspective (950) an alert is produced together with an explanation/suggested correction ("move to the center of the target"), and further image analysis is inhibited.

As shown at 980 mf 970, image quality is determined based on analysis. A possible measure of quality may be image blur. Another measure of quality may be a fixed disturbance (e.g. dirt on the camera lens). Only when the minimum image quality is verified image analysis for hit detection, center and spread analysis may proceed. Although the analysis in FIG. 3B is described in a post-capture mode, a similar or partial flow of actions may be executed in real-time so that the user can react to the "capture now" or corrective action suggestions thus accelerating the calibration process.

According to some embodiments of the present invention, bullet holes which are recorded as identified to one shooting session are ignored in the following shooting session. This is optionally facilitated by recording a shot group and ignoring the respective bullet holes when identifying a new shot group. In such embodiments, the bullet holes of a shot group are stored as historical bullet holes and when new image(s) depicting a shooting target with a new shot group is received new bullet holes are identified. The new bullet holes are identified in a calculation excluding the historical bullet holes. This process may be iteratively repeated to allow calculating a plurality of calibration instructions, either to the same firearm or for different firearms and/or sights of the same user or of difference users.

Figure 5:
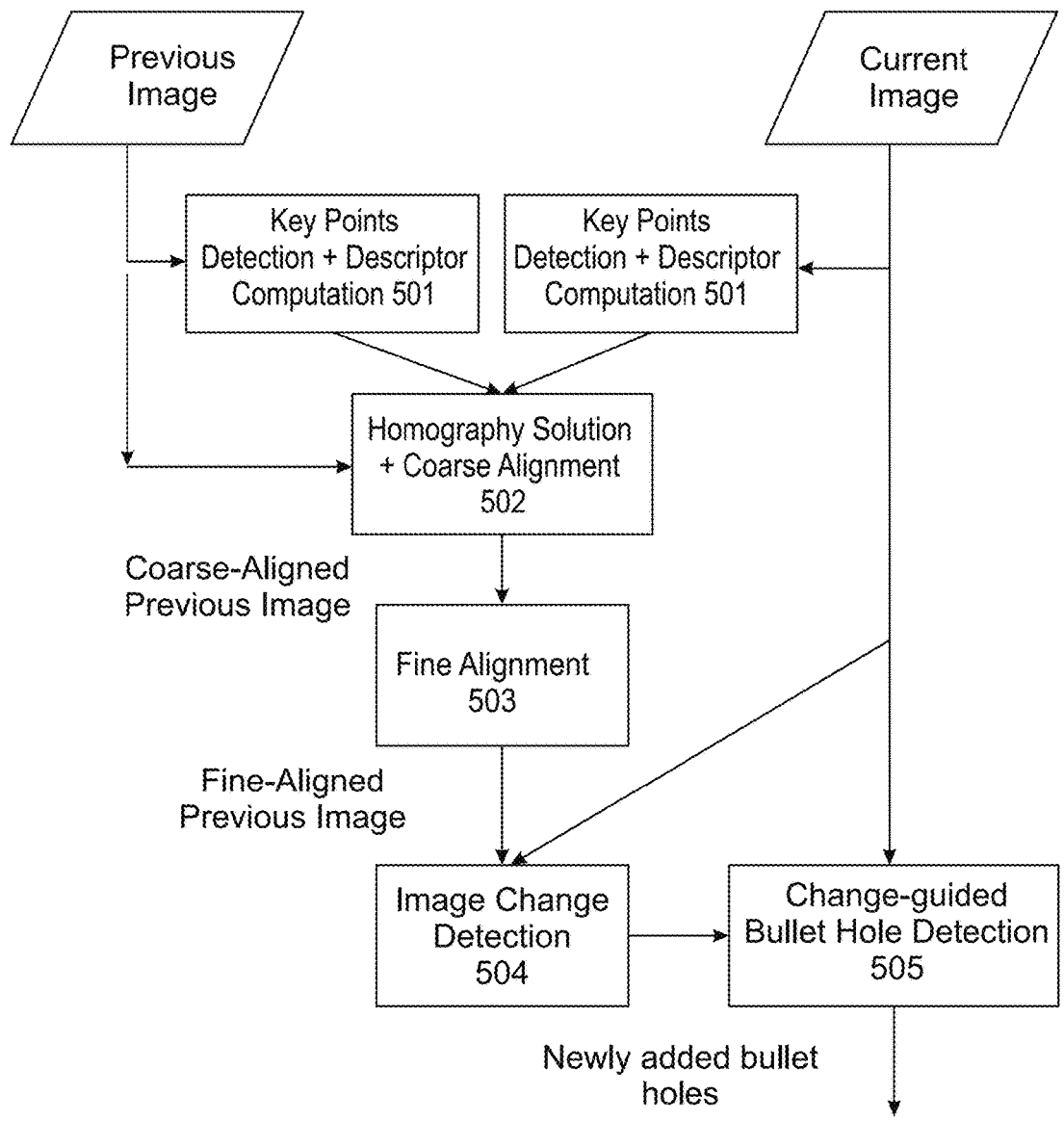
FIG. 5 is a process for identification of bullet holes assisted by a matching process wherein image(s) depicting the shot group, according to some embodiments of the present invention.

For example, reference is made to FIG. 5 wherein identification of bullet holes is further assisted by a matching process wherein image(s) depicting the shot group are compared with previously captured image(s) of the target. In such a manner, bullet-like regions that appeared in the previous image (set) are excluded from analysis in the new image(s). This would prevent previous holes, hole-like target markings (such as numerals) and hole-like spots to be considered.

Optionally, as described in FIG. 5, the matching process comprises of a geometric alignment process wherein the new images are brought into geometric registration with the previously captured image(s) prior to comparison, for instance by subtraction. The process described in FIG. 5 may be part of 304.

As shown at 501, the new images and the previously captured images are aligned by a coarse image alignment that includes keypoint detection, descriptor calculation, and keypoint matching. Then, as shown at 502, a homography transformation between the images is solved. Optionally, newly added bullet holes are ignored when executing the homography transformation between the images, for instance by adopting a scheme robust to outliers, in which the newly added bullet holes are rejected as outliers. Such a scheme is provided by RANSAC, see also [Random sample consensus: a paradigm for model fitting with applications to image analysis and automated cartography, Fischler and Bolles, Comm. ACM, Volume 24 Issue 6, June 1981, Pages 381-395.

The coarse alignment step may be alternatively performed according to a reference to a location of a known structure of the shooting target. For example, FIG. 1A depicts a target which customarily includes a "bullseye" pattern in the center of the target and an array of horizontal and vertical grid lines which are used for human measurement of bullet holes positions. These elements may be used as a reference. For instance, the bullseye pattern may be used to align the centers of the new image(s) with the center the previous image(s), optionally when the bullseye pattern and/or the grid lines pattern (or both) provide further scaling and/or rotation parameters, bring the new and the previous image into correspondence.

While the coarse alignment process is usually sufficient to exclude previous holes, it may be advantageous to perform further fine-alignment between the new image(s) and the previous image(s) (set). Such a process may be done as described in B. D. Lucas and T. Kanade (1981), An iterative image registration technique with an application to stereo vision. Proceedings of Imaging Understanding Workshop, pages 121-130.

Now, as shown at 504, image change is detected by comparing between the new images and the previously captured images. This allows identifying the new holes. This may be done using image subtraction, for example as described in image change detection algorithms: a systematic survey, R. J. Radke et al, IEEE Transactions on Image Processing, 14 (3) March 2005. For example, newly added holes are detected in a difference image calculating based on the differences between the new images and the previously captured images. This allows detecting a new hole intersecting with a previous hole, that otherwise may be detected as the same hole. An additional benefit of image alignment and subtraction is that it is sufficient to limit detection of holes to the difference zones, thereby greatly reducing the computing resources especially when processing is performed on a mobile device.

FIGS. 7A-7C are respectively screenshots of windows of a GUI presenting hole clusters captured during a calibration session. In each of the first two screenshots marks, colored dots, are added to holes of one cluster out of two clusters detected during the calibration session. In the third screenshots both clusters are marked and an indication of weapon calibration is presented. Optionally, holes of one cluster are separated from holes detected before the holes of the cluster are formed. For example, see how in FIG. 7C different clusters are colored differently (e.g. green and red—might not be shown in black and white printing).

Prior to image subtraction it may be necessary to correct for illumination differences, for example by a known process of histogram matching, so that pixel difference shall be affected by actual changes (such as new bullet holes) and not by illumination changes.

According to some embodiments of the present invention, a distribution pattern of the bullet holes of the shot group is calculated in relation to the shooting target. The distribution pattern may be indicative of an inaccurate shot group that is an outcome of unsteady shooting and therefore cannot be used for calibration. In such embodiments, the GUI may be instructed to present a recommendation to conduct an additional shooting session. The recommendation may detail an estimated reason for the unsteady shooting. For example, when the distribution pattern includes a plurality of holes which are arranged along a vertical line, the recommendation is to exhale before shooting and when the distribution pattern includes a plurality of holes which are arranged along a horizontal line, the recommendation is to perform shooting with a firmer grip.

According to some embodiments of the present invention, a shot group is identified after a shooting session ending is automatically detected. The ending may be determined by an analysis of an output of the sensor(s), for instance after 3, 5, or 7 or any intermediate or larger number shoots are audibly identified and/or when 3, 5, 7, or any intermediate or larger number of new bullet holes are detected by iteratively analyzing images of the shooting target. In such embodiments, an image sensor is mounted to continuously image the shooting target. For example when the system is implemented as a handheld device, the handheld device may be mounted on a holder that directs the image sensor of the handheld device toward the shooting target. The identification of the shot group triggers 303-306, optionally iteratively.

According to some embodiments of the present invention, the calibration recommendation and/or data documenting the shot group are stored in association with a unique ID value of the firearm. The unique ID may be manually inputted using the GUI and/or automatically identified, for instance by reading a machine readable code such as a tag or a barcode associated with the firearm or the shooting target. For example, a QR code may be read from the shooting target to indicate the unique ID value of the firearm. In another example, the machine readable code is a QR barcode that is read in advance from firearm documentation.

In such embodiments, firearm performances and/or calibration state can be tracked. Optionally, a user and/or an administrator are alerted by the system when a firearm was not calibrated for more than a defined period and/or after a known usage. Optionally, the shot group data and/or calibration data are used for calculating a firearm trend. The trend may indicate when the firearm should be sent for probing and/or for factory resetting.

According to some embodiments of the present invention, the calibration recommendation and/or data documenting the shot group are combined with calibration recommendation and/or data documenting historical shot groups of the specific firearm or of firearm and/or sight of a common type. This allows identifying trends of a firearm sight type functionally and/or evaluating firearm sight calibration drift or performances for a period.

According to some embodiments of the present invention, shot groups which are acquired in iterative shooting sessions of a calibration process of a firearm and/or sight are stored and tagged, for example with time stamp, a firearm type, a firearm ID, a shooter ID and/or the like. This allows creating a dataset that documents sequences of shot groups which are held in different calibration processes, for example by firearms of the same type and/or of the same firearm over time. Such dataset may be analyzed to identify trends and/or patterns of a certain firearm or of firearms of the same type. Such dataset may be used to create a classifier for classifying a current sequence of shot groups, for example to determine a malfunction in the firearm or the sight firearm. The trends and/or patterns may be indicative of a functionality level of firearms of the same type, for example a change in the needed frequency of firearm calibration over time and/or in correlation with a number of calibration sessions, a time related change in the accuracy of firearms of the same type, reaction of firearms of the same type to the time of the day and/or reaction of firearms of the same type to the type of the range (e.g. night range, day range, 25 m range, 100 m range and/or the like). The dataset may be used to set a firearm baseline. This allows using the firearm baseline to identify malfunctioning firearms and/or to assist in evaluating the performances of shooter, for instance by using the baseline for normalizing the effect of firearm aging and/or over usage.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a processor, an imaging device, and a sensor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for calculation of firearm sight calibration instructions by processing an image of a shooting target, comprising:
   receiving at least one image from at least one imaging device, the at least one image depicts a shooting target with a shot group comprising a plurality of bullet holes;
   receiving an indication of a firearm type and/or a firearm sight type to calibrate;
   using at least one hardware processor for calculating firearm sight calibration instructions according to at least one relative location of one of the plurality of bullet holes in relation to another of the plurality of bullet holes by processing the at least one image and at least one predefined parameter of the firearm and/or the firearm sight type; and
   outputting presentation instructions to present the firearm sight calibration instructions on a display of a client device.

2. The method of claim 1, further comprising identifying the plurality of bullet holes by:
   aligning the at least one image,
   calculating a difference image based on differences between the at least one image and at least one previously captured image of the shooting target, and
   separating between the plurality of bullet holes and a plurality of historical bullet holes according to the difference image.

3. The method of claim 1, wherein the indication in the firearm type.

4. The method of claim 1, wherein the indication in the firearm sight type.

5. The method of claim 1, wherein the at least one imaging device and the processor are integrated into a common handheld device.

6. The method of claim 1, further comprising:
   storing the plurality of bullet holes as a plurality of historical bullet holes;
   when at least one new image depicting the shooting target with a new shot group comprising a plurality of new bullet holes is received:
   the plurality of new bullet holes are identified in a calculation excluding the plurality of historical bullet holes, and
   the at least one hardware processor is used for:
   calculating a plurality of new distances between the plurality of new bullet holes by processing the at least one new image;
   calculating new firearm sight calibration instructions according to the plurality of new distances and the at least one predefined parameter;
   outputting new presentation instructions to present the new firearm sight calibration instructions on the display when calibration is not achieved.

7. The method of claim 1, wherein the at least one hardware processor is used for: calculating a shot group analysis based on a distribution pattern of the plurality of bullet holes in relation to the shooting target;
   wherein the presentation instructions comprise a recommendation selected according to an outcome of the shot group analysis.

8. The method of claim 1, wherein the at least one hardware processor is used for:
   analyzing an output of at least one sensor for an identification of an ending of a shooting event;
   triggering the calculation in response to the identification.

9. The method of claim 8, wherein the at least one sensor is a member selected from a group consisting of: an audio sensor, an accelerometer, a gyroscope sensor and an imaging sensor monitoring a front end of a barrel of the firearm.

10. The method of claim 8, wherein the at least one sensor is integrated in a mobile device used by the user.

11. The method of claim 1, wherein the firearm sight calibration instructions comprises an indication of a number and a direction of desecrate turning actions for turning a sight calibration knob.

12. The method of claim 1, further comprising presenting the shooting target through a graphical user interface (GUI), the shot group is marked by a user who uses the GUI.

13. The method of claim 1, further comprising:
receiving a firearm unique identifier value;
using the firearm unique identifier value for extracting information comprising at least one of: historical shot group data and historical firearm sight calibration instructions data;
estimating a firearm functionally according to an analysis of the extracted information and the output of an analysis of the shot group.

14. The method of claim 13, wherein the firearm unique identifier value is received from an analysis of a machine readable code imaged in at least one image.

15. The method of claim 13, wherein the firearm unique identifier value is received from a graphical user interface presented on a display of a mobile device.

16. The method of claim 1, further comprising:
acquiring information comprising at least one of: historical shot group data and historical firearm sight calibration instructions data of a plurality of firearms of the firearm type;
calculating a firearm sight type functionality score according to an analysis of the acquired information and the output of an analysis of the shot group.

17. The method of claim 1, further comprising:
acquiring historical data comprising at least one historical shot group of the firearm or of at least one other firearm of the firearm type; and
estimating a malfunction in the firearm according to a match between the historical data and the shot group.

18. The method of claim 1, further comprising classifying the shot group according to a classifier created based on an analysis of a plurality of historical shot groups of a plurality of other firearms or a plurality of firearm sights and/or manufacturer/professional instructions.

19. A handheld device of calculation firearm sight calibration instructions by processing an image of a shooting target, comprising:
at least one image sensor adapted to capture at least one image, the at least one image depicts a shooting target with a shot group comprising a plurality of bullet holes;
an interface adapted to receive an indication of a firearm type and/or a firearm sight type of a firearm to calibrate;
a memory storing a code;
at least one hardware processor adapted to execute a code for calculating firearm sight calibration instructions according to at least one relative location of one of the plurality of bullet holes in relation to another of the plurality of bullet holes by processing the at least one image and at least one predefined parameter of the firearm type and/or the firearm sight type;
a presentation unit adapted to present the firearm sight calibration instructions.

20. A computer program product for calculation of firearm sight calibration instructions by processing an image of a shooting target, the computer program product comprising a non transitory computer readable storage medium having program instructions embodied therewith, the program instructions executable by a processor to cause one or more computing unit to:
receive at least one image from at least one imaging device, the at least one image depicts a shooting target with a shot group comprising a plurality of bullet holes;
receive an indication of a firearm type and/or a firearm sight type of a firearm to calibrate;
calculate firearm sight calibration instructions according to at least one relative location of one of the plurality of bullet holes in relation to another of the plurality of bullet holes by processing the at least one image and at least one predefined parameter of the firearm type and/or the firearm sight type; and
output presentation instructions to present the firearm sight calibration instructions on a display of a client device.

* * * * *